United States Patent
Mishima et al.

(10) Patent No.: US 9,757,826 B2
(45) Date of Patent: Sep. 12, 2017

(54) METHOD OF CHARGING A HOLLOW VALVE WITH METALLIC SODIUM

(71) Applicant: FUJI OOZX INC., Shizuoka (JP)

(72) Inventors: Takashi Mishima, Shizuoka (JP); Hiroyuki Tsuchiyama, Shizuoka (JP); Satsoshi Narimatsu, Shizuoka (JP)

(73) Assignee: FUJI HOLLOW VALVE INC., Kikugawa-shi (JP)

( * ) Notice: Subject to any disclaimer, the term of this patent is extended or adjusted under 35 U.S.C. 154(b) by 0 days.

(21) Appl. No.: 14/785,950

(22) PCT Filed: Sep. 2, 2014

(86) PCT No.: PCT/JP2014/073005
§ 371 (c)(1),
(2) Date: Oct. 21, 2015

(87) PCT Pub. No.: WO2016/035132
PCT Pub. Date: Mar. 10, 2016

(65) Prior Publication Data
US 2016/0279746 A1    Sep. 29, 2016

(51) Int. Cl.
*B23P 15/00*    (2006.01)
*F01L 3/14*    (2006.01)
(Continued)

(52) U.S. Cl.
CPC .......... *B23P 15/002* (2013.01); *B21C 23/002* (2013.01); *B21K 1/22* (2013.01);
(Continued)

(58) Field of Classification Search
CPC .......... B23P 15/002; F16K 49/00; F16K 1/36; F01L 3/14; F01L 3/24; Y10T 29/49311; Y10T 29/49307; Y10T 29/49298
See application file for complete search history.

(56) References Cited

U.S. PATENT DOCUMENTS

2016/0256965 A1* 9/2016 Ishii .................. B21K 1/22

FOREIGN PATENT DOCUMENTS

| JP | 04-232318 A | 8/1992 |
| JP | 04-272413 A | 9/1992 |

(Continued)

OTHER PUBLICATIONS

International Search Report for corresponding International Application No. PCT/JP2014/073005 mailed Dec. 2, 2014 with English translation.

(Continued)

*Primary Examiner* — Sarang Afzali
(74) *Attorney, Agent, or Firm* — Renner Otto Boisselle & Sklar, LLP

(57) ABSTRACT

A method of charging a hollow valve with metallic sodium includes providing a workpiece, as a semi-finished product for a hollow poppet valve, in which a cavity has an upward opening at a free end of a valve stem at a working position; inserting a nozzle into the opening to feed an initial inert gas into the cavity by jetting the inert gas from the nozzle; moving up the nozzle to put a holder between the workpiece and the nozzle, the holder holding a rod-like metallic sodium; and inserting the nozzle into a first end of the holder while an additional inert gas is jetted into the cavity from the nozzle to push down the rod-like metallic sodium along with the inert gas from a second end of the holder into the cavity of the workpiece.

5 Claims, 6 Drawing Sheets

(51) Int. Cl.
    F01L 3/24      (2006.01)
    F16K 1/36      (2006.01)
    F16K 49/00     (2006.01)
    B21K 1/22      (2006.01)
    B21C 23/00     (2006.01)
(52) U.S. Cl.
    CPC    F01L 3/14 (2013.01); F01L 3/24 (2013.01);
           F16K 1/36 (2013.01); F16K 49/00 (2013.01);
              F01L 2103/00 (2013.01); F01L 2103/01
                  (2013.01); Y10T 29/49307 (2015.01)

(56) References Cited

FOREIGN PATENT DOCUMENTS

| JP | 2012-136978 A | 7/2012 | | |
|---|---|---|---|---|
| JP | 2012-136979 A | 7/2012 | | |
| JP | WO 2013145250 A1 | * 10/2013 | ............... | F01L 3/02 |
| JP | WO 2015075795 A1 | * 5/2015 | ............... | B21K 1/22 |

OTHER PUBLICATIONS

Form PCT/ISA/237 for corresponding International Application No. PCT/JP2014/073005 dated Dec. 2, 2014 with English translation.
Decision to Grant a Patent for corresponding Japanese Application No. 2015-501991 issued Mar. 30, 2015 with English translation.

* cited by examiner

METHOD OF CHARGING A HOLLOW VALVE WITH METALLIC SODIUM

CROSS REFERENCE TO RELATED APPLICATION

This is the U.S. National Stage of International Application No. PCT/JP2015/073005 filed Sep. 2, 2015.

BACKGROUND OF THE INVENTION

The present invention relates to a method of charging a hollow valve used in an internal combustion engine with metallic sodium, and an apparatus therefor.

Poppet valves used in an internal combustion engine, particularly for cars, are hollow to lighten and improve engine performance, and metallic sodium is sealed in a hollow valve stem to reduce thermal load.

As a method of charging a hollow poppet valve with metallic sodium and an apparatus therefor, in JP2012-136978A, a cavity of a workpiece, as a semi-finished product for a poppet valve, is open at a free end of a valve stem and is disposed at a working position in which the opening of the cavity is directed upward. A nozzle for feeding an inert gas and a metallic-sodium feeding tube are inserted into the opening. The metallic sodium is fed from the metallic-sodium feeding tube while the inert gas is fed from the nozzle. Hence, the cavity in the workpiece is charged with the metallic sodium without being oxidized with air in JP2012-136978A.

In JP2012-136978A in which an external diameter of the valve stem of the poppet valve and internal diameter of the cavity therein are large, it is possible to insert the inert-gas feeding nozzle into the cavity with the metallic-sodium feeding tube. When a diameter of the valve stem of the poppet valve and an internal diameter of the cavity therein are small, it is very difficult or impossible to insert the inert-gas feeding tube into the cavity with the metallic-sodium feeding tube.

In embodiment 2 in FIGS. 6 and 7 of JP2012-136978A, an inert gas 25 is introduced at an upstream side of the metallic sodium tank 16 via a three-way valve V31 and a regulating valve V41, and the metallic sodium is pressed into the cavity of the valve. However, the metallic-sodium feeding tubes and inert-gas feeding tubes become complicated and it is necessary to provide a lot of regulating valves thereby making the whole apparatus more complicated and larger. In actual operation, it is necessary to control a lot of regulating valves thereby making operation more complicated.

SUMMARY OF THE INVENTION

In view of the disadvantages in the prior art, it is an object of the invention to provide a method of charging a cavity of a hollow valve with metallic sodium easily and swiftly without being oxidized over the surface of the metallic sodium wherein the hollow valve has a small-diameter valve stem and an apparatus for carrying out the method more efficiently.

DETAILED DESCRIPTION OF PREFERRED EMBODIMENTS

One embodiment of an apparatus for charging a hollow valve with metallic sodium according to the present invention will be described with respect to the drawings, and one embodiment of a method of charging the hollow valve with the metallic sodium using the apparatus.

Figure 1:
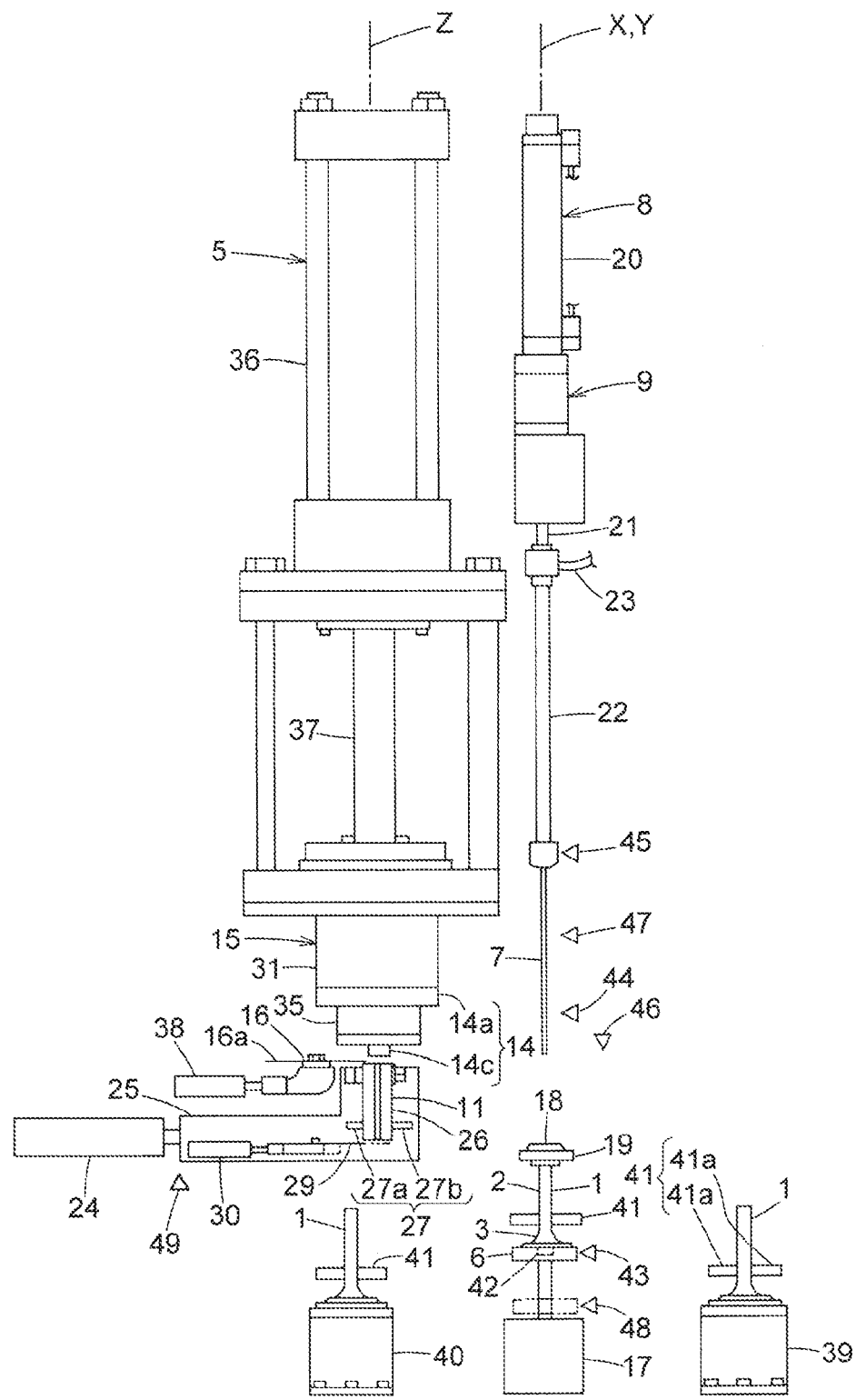
FIG. 1 is a front elevational view of a main part of one embodiment of an apparatus according to the present invention.
Figure 3:
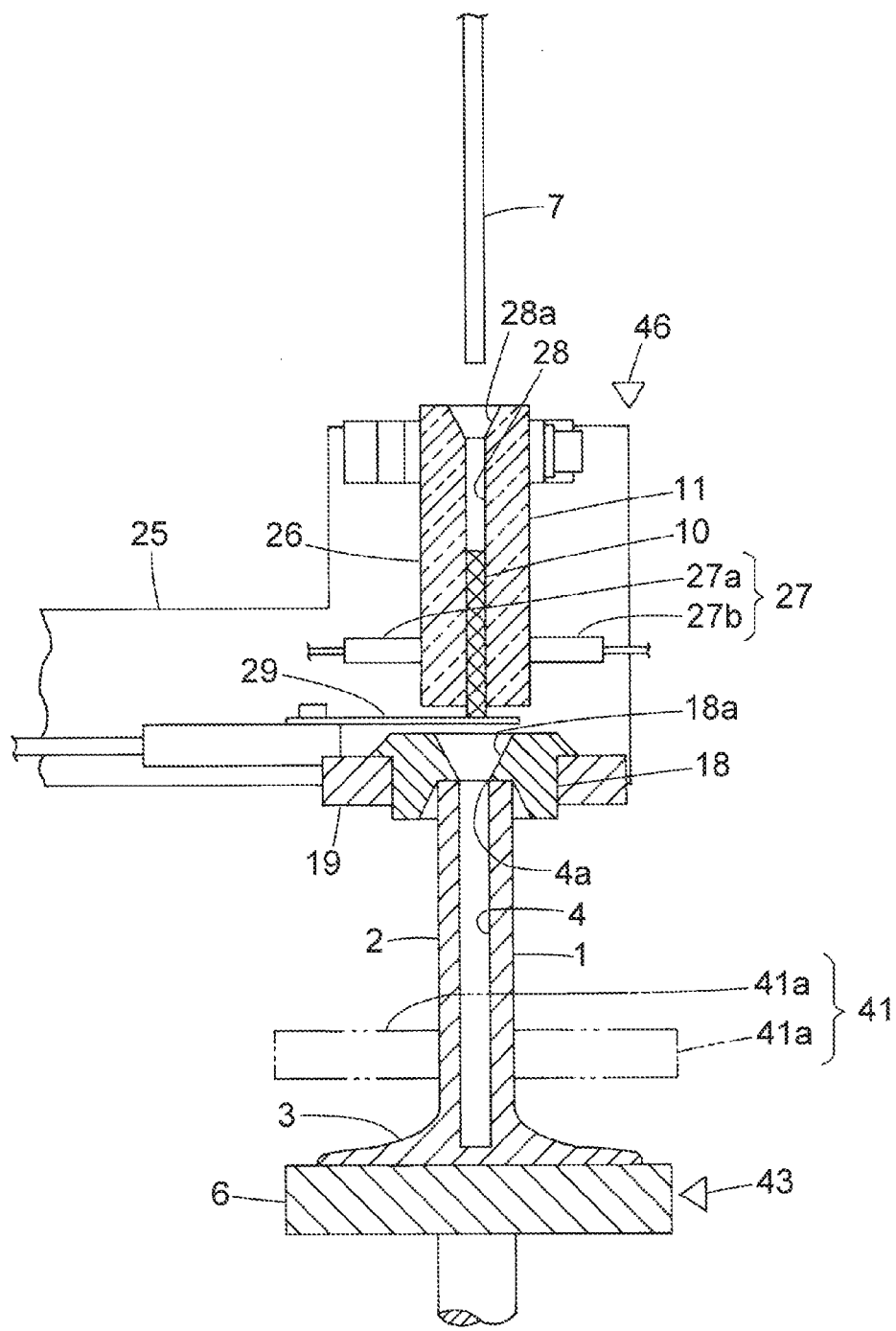
FIG. 3 is an enlarged vertical sectional front view showing relationship between a workpiece, a holder and a nozzle during operation.

A workpiece in FIG. 1 is a semi-fabricated product of a hollow poppet valve in which a valve head 3 is formed at one end of a valve stem 2 which has a cavity 4 which is open at the other end of the valve stem 2 and has a bottom in FIG. 3.

The cavity 4 is formed in the valve stem 2 with a gun drill (not shown) from a free end (opposite the valve head 3) of the valve stem 2. A material such as a steel rod is extruded forward with heat squeezing and gradually changed to a final shape of the poppet valve. The cavity 4 may be formed together with molding of the poppet valve.

After metallic sodium 10 later described is inserted into the cavity 4 of the workpiece 1 according to the method of the present invention, an axial end member (not shown) is fixed to the free end of the valve stem 2 by friction welding and the metallic sodium 10 is sealed in the cavity 4. The step does not directly relate to the present invention and is neither depicted nor described.

In FIG. 1, the apparatus for charging a hollow valve with metallic sodium according to the present invention (hereinafter called the apparatus) comprises a workpiece support 6 that supports the workpiece 1 in a working position X in which an opening 4a (in FIG. 3) of the cavity 4 is directed upward; an inert gas feeding unit 9 that comprises a vertical nozzle 7 that is capable of coming into the cavity 4 of the workpiece 1 in the working position X from above and an elevator 8 for raising and lowering the nozzle 7 and jetting an inert gas from the end of the nozzle 7; a holder 11 that is capable of holding the vertical rod-like metallic sodium 10 (FIG. 2) and of reciprocally moving between a feeding position Y where the metallic sodium 10 is positioned right above the cavity 4 of the workpiece 1 in the working position X and a receiving position Z beside the feeding position Y; a metallic sodium extrusion unit 15 in which the metallic sodium 10 stored in a cylinder is pressed down by a piston 13 and extruded like a rod through a nozzle 14 under the cylinder 12 so that the metallic sodium 10 is fed into the holder 11 in the receiving position Z; and a cutter 16 that cuts rod-like metallic sodium 10 extruded from the nozzle 14 of the metallic sodium extrusion unit 15.

The workpiece support 6 is moved up and down by an elevator 17 such as an air cylinder on a fixed object (all fixed objects are not shown). When the workpiece support 6 is moved up, the upper end of the valve stem 2 of the workpiece 1 on the workpiece support 6 comes in contact with the lower surface of a guide member 18 having a taper hole 18a which widens upward coaxially with the taper hole 18a.

The guide member 18 is fixed to a horizontal fixed plate 19 fixed to a proper fixed body above the workpiece support 6.

In FIG. 1, the elevator 8 of the inert-gas feeding unit 9 is a downward air cylinder 20 provided to a proper fixed body above the guide member 18 in the working position X. A tube 22 is coupled to the lower end of a piston rod 21 which suspends from the air cylinder 20, and the upper end of the nozzle 7 is coupled to the lower end of the tube 22.

To an inert gas source (not shown) is coupled one end of an inert gas feeding tube 23 the other end of which is coupled to the upper end of the tube 22. An inert gas is jetted from the end of the nozzle 7 through the tube 22 and the nozzle 7. The inert gas may preferably be $N_2$ or Ar.

The nozzle 7 is guided by the air cylinder 20 provided to the proper fixed object. The lower end of the nozzle 7 is guided through the taper hole 18a of the guide member 18 and moves between a lower limit position where it reaches close to the bottom in the cavity 4 of the workpiece 1 on the workpiece support 6 and an upper limit position where it does not prevent the holder 11 from moving.

The holder 11 comprises a transparent cylindrical synthetic-resin body 26 fixed to a moving plate 25 which moves horizontally by an air cylinder 24 on a fixed object. The body 26 has at the side of the lower part a light emitter 27a and a photodetector 27b of a metallic sodium sensor 27 or a photoelectric sensor in FIG. 2.

Figure 2:
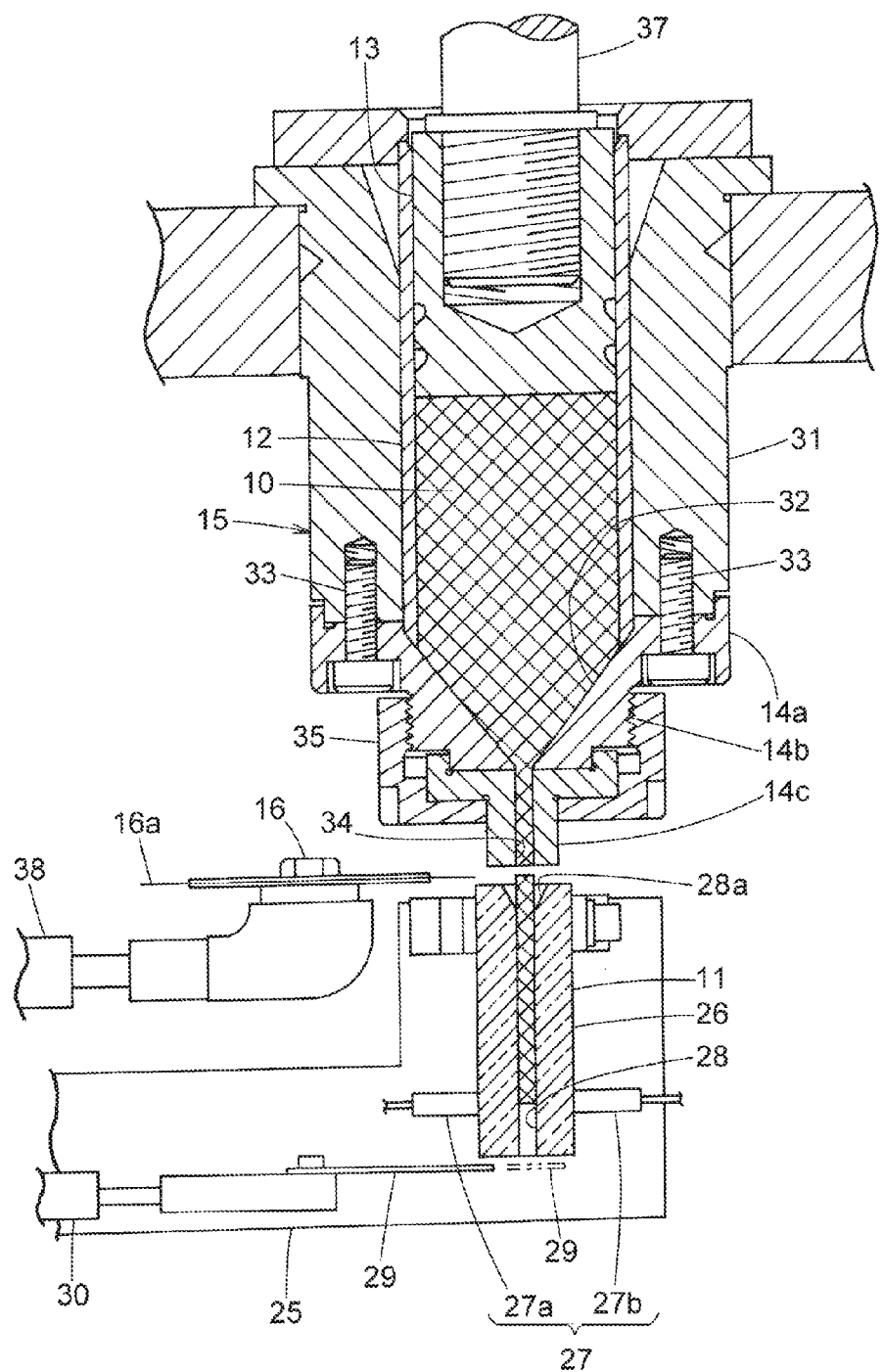
FIG. 2 is an enlarged vertical sectional front view thereof.

In FIG. 2, at the center of the body 26, there is provided a vertical holding hole 28 which has a taper hole 28a expanding upward.

In FIGS. 1 and 2, right under the holder 11 of the moving plate 25, there is a shutter 29 which prevents falling of the rod-like metallic sodium 10 held in the holder 11. The shutter 29 is opened and closed by an opener 30 comprising an air cylinder on the moving plate 25, between a closed position (in dotted lines in FIG. 2) right under the holding hole 28 of the holder 11 and an open position (in solid lines in FIG. 2) apart from the right-under position of the holding plate 28 sideward.

In FIG. 2, the cylinder 12 of the metallic sodium extrusion unit 15 is held in a holding tube 31 supported by a fixed body. At the lower end of the holding tube 31, a first nozzle 14a having a taper hole 32 which tapers downward is fixed with bolts 33, and a second nozzle 14c having a smaller hole 34 which communicates with the taper hole 32 is bound in a smaller-diameter axial portion 14b at the lower part of the first nozzle 14a with binding means 35.

The nozzle 14 comprises the first nozzle 14a and the second nozzle 14c.

The piston 13 in the cylinder 12 is coupled to the lower end of a piston rod 37 which suspends from an air cylinder 36 in FIG. 1 supported to a suitable fixed body above it. The piston rod 37 is moved down by the air cylinder 36 to press down the metallic sodium 10 in the cylinder 12. The metallic sodium 10 is pressed out of the lower end of a second nozzle 14c through a small hole 34 of the second nozzle 14c from a taper hole 32 of a first nozzle 14a.

A cutter 16 comprises an air grinder that has a thin rotary blade 16a such as 0.03 mm and reciprocates between a cutting position where the rotary blade 16a is positioned right under the small hole 34 of the second nozzle 14c and a withdrawn position where the rotary blade 16 is away from the small hole 34 sideward.

In FIG. 1, there are a first mass measuring device 39 for measuring mass W1 of the workpiece before it is provided to a working position X and a second mass measuring device 40 for measuring mass W2 of the workpiece 1 which is charged with the metallic sodium 10 at the working position X.

The workpiece 1 is held by openable holding means having a pair of fingers 41a, 41a which hold the valve stem 2 and moved from a position where it is on the first mass measuring device 39 to a position where it is on the workpiece support and from the position where it is on the workpiece support 6 to a position where it is on the second mass measuring device 40.

Thus, the holding means 41 not only can open and close the pair of fingers 41a, 41a, but also can move vertically and horizontally.

Various kinds of sensors for detecting motion of each member are provided on the feeding device 5.

A first sensor 42 detects that the workpiece 1 is disposed on the workpiece support 6; a second sensor 43 detects that the workpiece 1 moves up until the upper end of the workpiece 1 comes in contact with the lower surface of the guide member 18; a third sensor 44 detects that the nozzle 7 comes to a lower-limit position; a fourth sensor 45 detects that that the nozzle 7 comes to an upper-limit position; a fifth sensor 46 detects that the holder 11 is moved to the feeding position Y; a sixth sensor 47 detects that the lower end of the nozzle 7 moves down to an intermediate position close to the guide member 18; a seventh sensor 48 detects that the workpiece support 6 moves down to the lower-limit position; and an eighth sensor 49 detects that the holder 11 comes to a receiving position Z.

Figure 4:
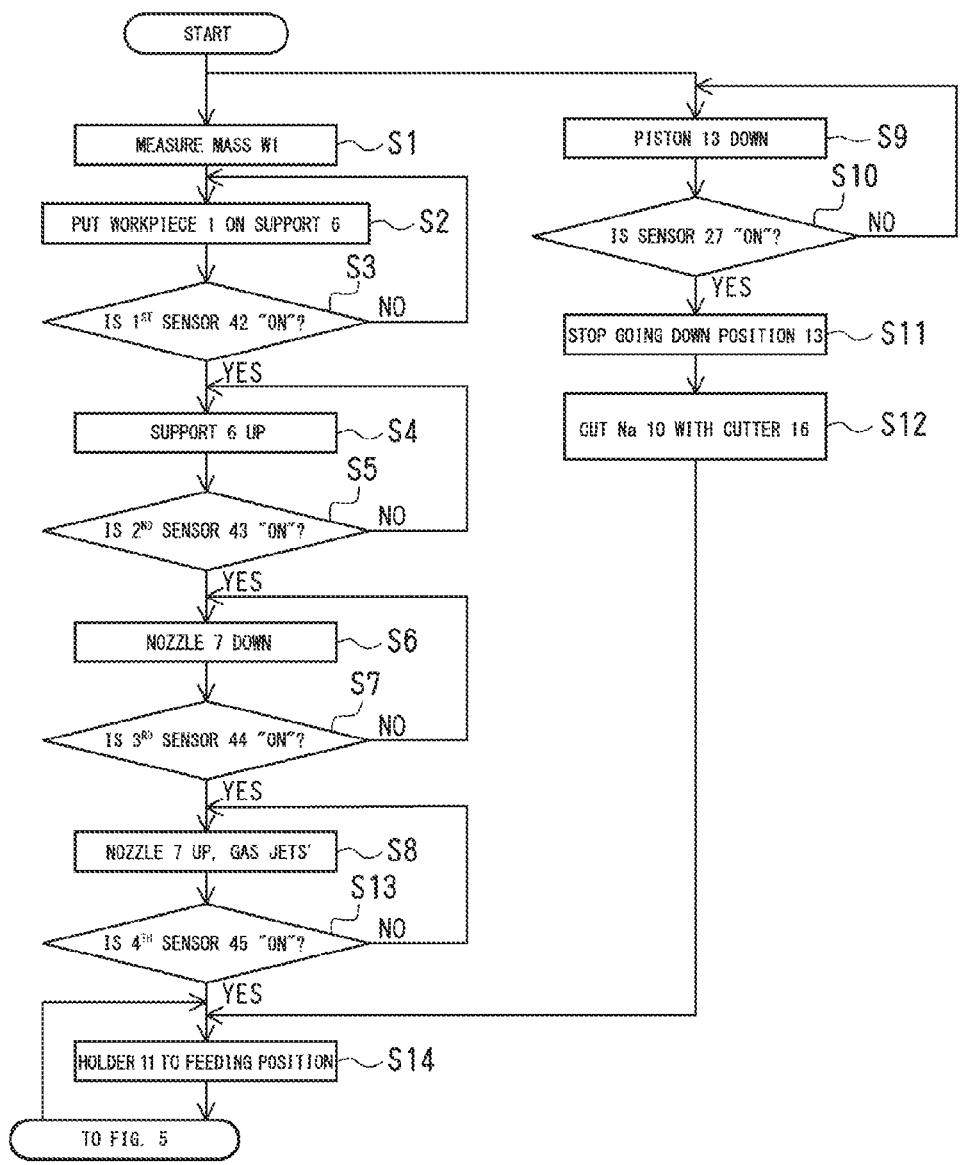
FIG. 4 is a former-half flow chart showing working steps of one embodiment of a method according to the present invention.
Figure 5:
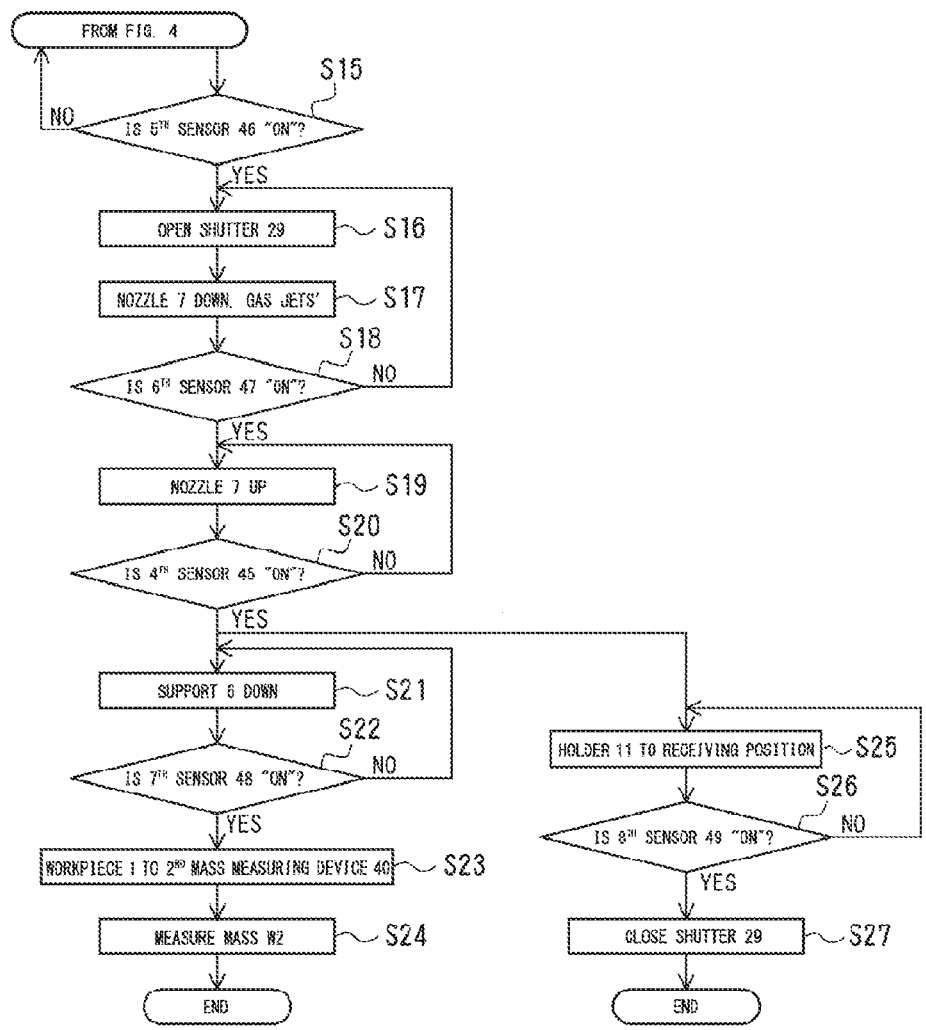
FIG. 5 is a latter-half flow chart showing working steps of one embodiment of the method.

Then, one embodiment of a method of charging hollow valve with the metallic sodium according to the present invention and operation of the feeding device 5 will be described with a flow chart in FIG. 4.

Prior to starting of the operation, after the cylinder 12 is charged with the metallic sodium 10, the piston 13 is moved down and the metallic sodium 10 comes close to the end of the second nozzle 14c.

The holder 11 remains stationary in the receiving position Z; the shutter 29 is in a closed position; and the workpiece support 6 is positioned in the lower-limit position.

From this state, the first workpiece 1 held by the holding means 41 is disposed on the first mass measuring device 39 which measures mass W1 of the workpiece 1 before movement to the working position X while the fingers 41a, 41a of the holding means 41 are open. (S1)

The information about the mass W1 is transmitted to a control (not shown) and stored in a memory (not shown).

The fingers 41a, 41a of the holding means 41 are closed, so that the workpiece 1 is grasped by the holding means 41 and moved onto the workpiece support 6. (S2)

When the first sensor 42 detects that the workpiece 1 is disposed on the workpiece support 6 (S3), the workpiece 1 is moved up by an elevator 17 until the upper end of the workpiece 1 comes in contact with the lower surface of the guide member 18.

The fingers 41a, 41a of the holding means 41 may be open to a position where the workpiece 1 is not prevented from moving up, or may be closed so that the holding means 41 moves up with the workpiece 1 and workpiece support 6.

When the second sensor 43 detects that the upper end of the workpiece 1 comes in contact with the lower surface of the guide member 18 with elevation of the workpiece support 6 to the upper-limit position, the nozzle 7 and hollow tube 22 are moved down together by the air cylinder 20.

When the third sensor 44 detects that the nozzle 7 comes to the lower-limit position (S7), an inert gas is jetted from the end of the nozzle 7 and the nozzle and hollow tube 22 are moved up to the upper-limit position by the air cylinder 20. (S8)

With the operation from starting, in the metallic sodium extrusion device 16, the piston 13 is moved down by the air cylinder 36, and the metallic sodium 10 in the cylinder 12 is compressed and pressed out of the lower end of the nozzle 14 like a rod. (S9)

The metallic sodium 10 which is pressed out like a rod is introduced into the holding hole 28, and the end thereof comes to a position of a metallic sodium sensor 27, which is actuated, so that the piston 13 stops lowering at the position. Then, the rotary blade 16a of the cutter 16 is rotated. While the rotary blade 16a rotates by the air cylinder 38, it is moved to the cutting position once and returned to the original withdrawn position after the rod-like metallic sodium is cut off. Thereafter, the rotary blade 16a stops rotation.

The rod-like metallic sodium 10 which is cut off by the cutter 16 is lowered in the holding hole 28 until the lower end comes in contact with the shutter 29 and is held in the holder 11.

Figure 6:
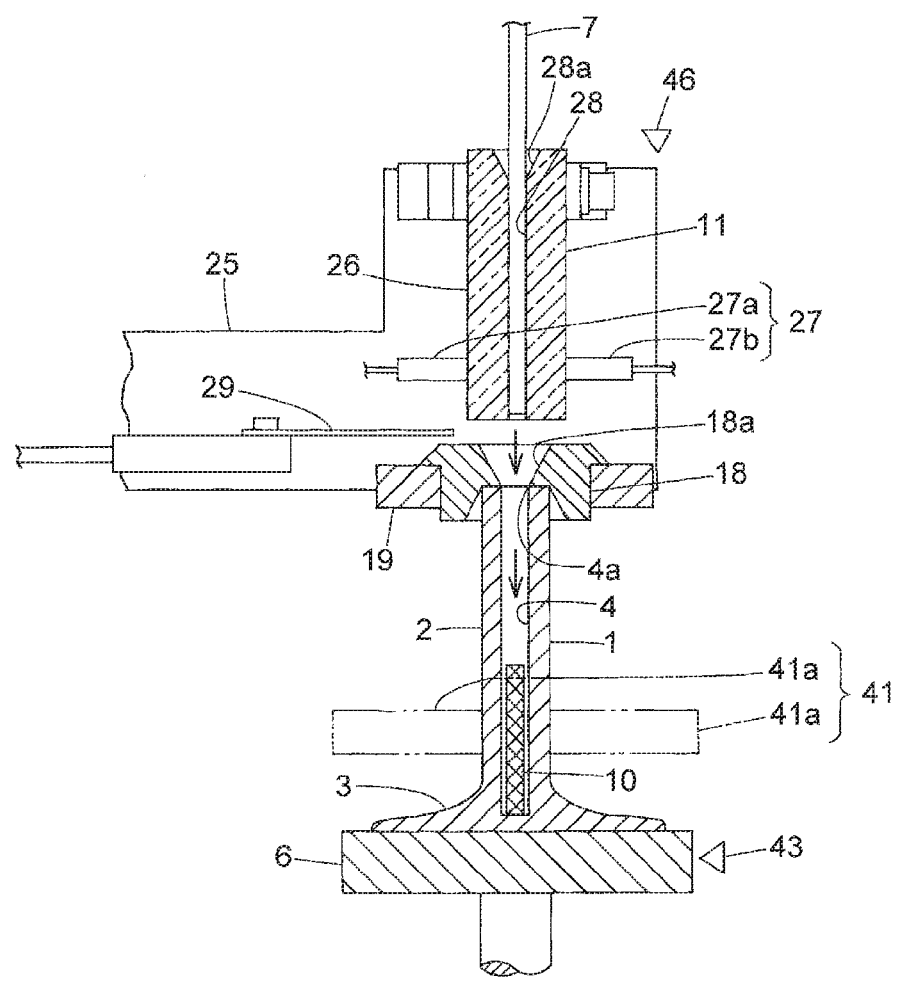
FIG. 6 is a vertical sectional view similar to FIG. 3 and showing working steps of one embodiment of the method in which a metal sodium is pressed into a cavity of a workpiece.

In the working position, when the fourth sensor 45 detects that the nozzle 7 and hollow tube 22 moves up to the upper-limit position, the holder 11 is moved with the moving plate 25 and shutter 29 by the air cylinder 24 from the receiving position Z to the feeding position Y. (S14) When the fifth sensor 46 detects it (S15), the shutter 29 is moved to the open position by the opening means 30. (S16) Then, the nozzle 7 is lowered by the air cylinder 20 while it jets the inert gas. By jetting the inert gas, the rod-like metallic sodium 10 in the holder 11 is pressed down into the cavity 4 of the workpiece through the taper hole 18a of the guide member 18 (S17), which is shown in FIG. 6.

The nozzle 7 lowers until the lower end of the nozzle 7 is close to the guide member 18 (or the holder 11), and the sixth sensor 47 detects it (S16). The nozzle 7 is elevated to the upper-limit position by the air cylinder 20. (S19)

The fourth sensor 45 detects that the nozzle 7 elevates to the upper-limit position. (S20) The workpiece support 6 and the workpiece 1 disposed on it is lowered to the lower-limit position. (S21) The seventh sensor 48 detects it. (S22) When the fingers 41a, 41a of the holding means 41 are open, they are closed to hold the workpiece 1. While the workpiece 1 is held by the closed fingers 41a, 41a of the holding means 41, the holding means 41 rises with the workpiece 1 and the workpiece support 6. While the holding means 41 holds the workpiece 1, the holding means 41 rises, moves leftward and lowers. Thereafter, the fingers 41a, 41a open, and the workpiece 1 is transferred from the workpiece support 6 onto a second mass-measuring device 40. (S23) Mass W2 of the workpiece 1 of which the metallic sodium 10 is stored within the cavity 4 is measured. (S24)

Information about the mass W2 measured by the second mass measuring device 40 is transmitted to the control in which the difference $\Delta W=W2-W1$ is calculated from the mass W2 and the mass W1 of the workpiece 1 which is transmitted from the first mass measuring device 39. The difference $\Delta W$ is compared with a set weight W0 of the metallic sodium 10 fed in the workpiece 1. Hence, it can exactly be known whether the workpiece 1 is charged with a suitable weight of the metallic sodium 10 and possible failure in the operation can be found as early as possible.

After the mass W2 is measured, the workpiece 1 is held by another holding means (not shown) similar to the holding means 41. In a next welding step, an axial end member (not shown) is fixed to a free end of the stem 2 by friction welding, and the metallic sodium 10 is sealed in the cavity 4.

Inert gas atmosphere may preferably be put around the valve stem 2 of the workpiece 1 disposed on the second mass measuring device 40, around the workpiece 1 transferred to the welding step, around the lower end of the metallic sodium extrusion device 15 and around a moving path of the holder 11.

In the step S20, when the fourth sensor 45 detects that the nozzle 7 elevates to the upper-limit position, the holder 11 is moved with the moving plate 25 and the shutter 29 from the feeding position Y to the receiving position Z (S25) by the air cylinder 24 while the workpiece support 6 lowers. When the eighth sensor 49 detects that the holder 11 comes to the receiving position Z (S26), the shutter 29 is moved to a closing position (S27) by the opening/closing means 30 (S27) and is waiting for supply of the rod-like metallic sodium 10 from the metallic sodium extrusion device 15.

Thereafter, similar operations to the above are repeated, and the cavities 4 of the workpieces are charged with the rod-like metallic sodium 10 in turn without being oxidized over the surface of the sodium 10.

According to the method of the metallic sodium into the hollow valve in this invention, the cavity 4 of the hollow valve smaller in diameter of the valve stem 2 can be charged with the metallic sodium 10 easily and swiftly without being oxidized over the surface of the sodium 10.

The cavity 4 of the workpiece 1 can automatically be charged with the metallic sodium 10 easily and swiftly by only three operations which comprise elevating/lowering of the nozzle 7 for feeding an inert gas, reciprocation between the feeding position and receiving position of the holder 11 and extrusion of the metallic sodium 10 by the metallic sodium extrusion device 15.

The present invention is not limited to the foregoing embodiment, but the following variations may be made without departing from the scope of claims:

1. A single mass measuring device measures mass W1 of the workpiece 1 before the workpiece 1 is provided at the working position and mass W2 of the workpiece 1 which is charged with the metallic sodium 10.

2. A single mass measuring device (not shown) is provided on the workpiece support 6 and measures mass W1 of the workpiece 1 before the metallic sodium 10 is fed and mass W2 of the workpiece 1 which is charged with the metallic sodium 10.

What is claimed is:
1. A method of charging a hollow valve with metallic sodium, the method comprising:
  Providing a workpiece, as a semi-finished product for a hollow poppet valve, in which a cavity has an upward opening at a free end of a valve stem at a working position;
  inserting a nozzle into the opening to feed an initial inert gas into the cavity by jetting the inert gas from the nozzle;
  moving up the nozzle to put a holder between the workpiece and the nozzle, the holder holding a rod-like metallic sodium; and
  inserting the nozzle into the through hole of the holder from a first end of the holder while jetting an additional inert gas from the nozzle to push down from a second end of the holder the rod-like metallic sodium into the cavity of the workpiece.

2. The method of claim 1, further comprising a measuring mass W1 of the workpiece before the cavity of the workpiece is charged with the metallic sodium; a measuring mass W2 of the workpiece after the cavity of the workpiece is charged with the metallic sodium; and determining whether or not the workpiece is charged with a suitable amount of the metallic sodium based on a difference of the masses $\Delta W = W2 - W1$.

3. The method of claim 1, wherein the holder is capable of moving between a feeding position where the held rod-like metallic sodium is fed into the workpiece and a receiving position which is away from the feeding position sideward, wherein a predetermined length of the rod-like metallic sodium which is pressed out of a metallic-sodium extrusion device and cut at a predetermined length is held by the holder.

4. The method of claim 1, wherein each of the initial and additional inert gas includes argon.

5. The method of claim 1, wherein each of the initial and additional inert gas includes N2.

\* \* \* \* \*